US006272348B1

United States Patent
Saario et al.

(10) Patent No.: US 6,272,348 B1
(45) Date of Patent: Aug. 7, 2001

(54) METHOD FOR CHANNEL ALLOCATION (75) Inventors: Eija Saario; Oscar Salonaho, both of Helsinki (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/401,887

(22) Filed: Sep. 23, 1999

Related U.S. Application Data (63) Continuation of application No. PCT/FI98/00363, filed on Apr. 24, 1998.

(30) Foreign Application Priority Data

Apr. 25, 1997 (FI) .......................................... 971790

(51) Int. Cl.[7] .................................................. H04O 7/20
(52) U.S. Cl. ........................... 455/452; 455/448; 455/454
(58) Field of Search .................................. 455/452, 453, 455/454, 450, 447, 446, 448

(56) References Cited

U.S. PATENT DOCUMENTS

| 5,323,447 |   | 6/1994  | Gillis et al. ............... 379/61   |
|-----------|---|---------|----------------------------------------|
| 5,408,496 | * | 4/1995  | Ritz et al. ............... 455/54.1   |
| 5,430,761 | * | 7/1995  | Bruckert et al. ........... 375/200    |
| 5,581,548 | * | 12/1996 | Ugland et al. ............. 370/330    |
| 5,663,957 | * | 9/1997  | Dent ....................... 370/347   |
| 5,737,358 | * | 4/1998  | Ritz et al. ................ 375/202   |
| 5,774,808 | * | 6/1998  | Sarkioja et al. ............ 455/436   |
| 5,805,633 | * | 9/1998  | Uddenfelt ................. 455/454    |

FOREIGN PATENT DOCUMENTS

| 0 637 895 | 2/1995 | (EP) . |
| 95/25406  | 9/1995 | (WO) . |
| 96/07284  | 3/1996 | (WO) . |
| 97/01889  | 1/1997 | (WO) . |

OTHER PUBLICATIONS

"Channel Assignment Schemes for Cellular Mobile Telecommunication Systems: A Comprehensive Survey" Katzela, et al. IEEE Personal Communications, Jun. 1996.

* cited by examiner

Primary Examiner—Daniel Hunter
Assistant Examiner—Thuan T. Nguyen
(74) Attorney, Agent, or Firm—Altera Law Group, LLC (57) ABSTRACT

The idea of the invention is to allocate channels within a predetermined group of cells with a dynamic channel allocation method and to equalize interference caused to the cell group by connections outside the cell group e.g. through frequency or time slot hopping. Cell groups may be superimposed and they may be formed e.g. by the cells of an office system or a broad-coverage mobile communications system, by the cells of a mobile communications network of two different operators, by the cells of a network according to two different systems or by the cells of a network operated by one operator. If the cell groups are formed of cells in one network, a suitable size may be chosen for the cell group so that the computing and signalling load required by centralized dynamic channel allocation in the cell group will remain easily controllable.

15 Claims, 8 Drawing Sheets

PRIOR ART

METHOD FOR CHANNEL ALLOCATION

The application is a continuation of PCT/FI98/00363 filed Apr. 24, 1998.

FIELD OF THE INVENTION

This invention relates to the allocation of channels and to equalising of interference suffered by connections in a radio network.

BACKGROUND OF THE INVENTION

In mobile communications systems, mobile stations and base transceiver stations may set up connections through channels of a so-called radio interface. Depending on the type of information to be transferred, demands are made on the connections in regard to faultlessness of transferred data and in regard to transfer lag.

A certain frequency area is always allocated for use by the mobile communications system. To have sufficient capacity in the mobile communications system on this limited frequency band, the channels which are in use must be used several times. For this reason, the coverage area of the system is divided into cells formed by the radio coverage areas of individual base transceiver stations, which is why the systems are often also called cellular radio systems.

Figure 1:
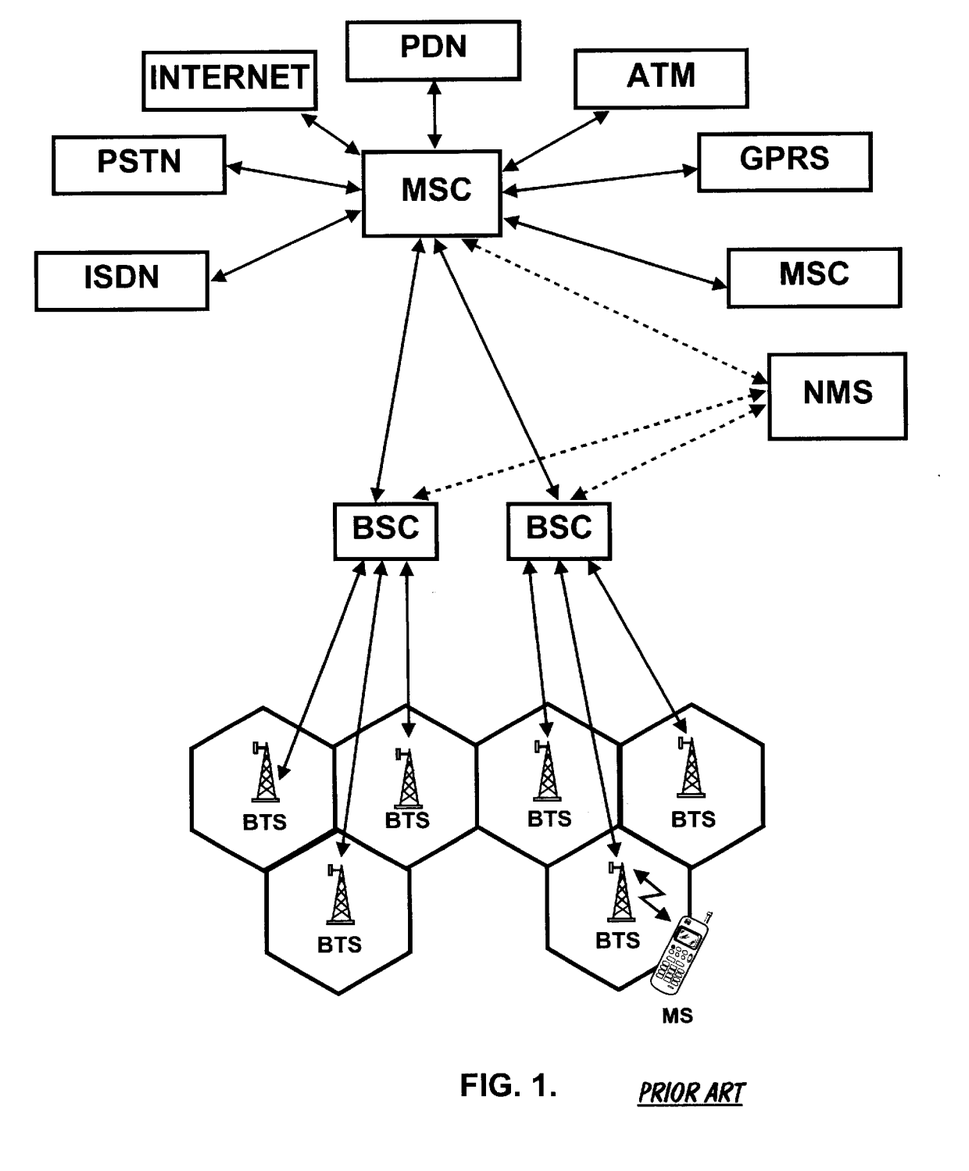
FIG. 1 shows an example of the structure of a mobile communications network.

FIG. 1 shows the main structural features of a known mobile communications system. The network comprises several inter-connected MSCs (Mobile Services Switching Centre). The mobile services switching centre MSC can set up connections with other mobile services switching centres MSC or with other telecommunication networks, e.g. ISDN (Integrated Services Digital Network), PSTN (Public Switched Telephone Network), Internet, PDN (Packet Data Network), ATM (Asynchronous Transfer Mode) or GPRS (General Packet Radio Service). Several base station controllers BSC are connected to the mobile services switching centre MSC. Base transceiver stations BTS are connected to each base station controller. The base transceiver station may set up connections with mobile stations MS. A network management system NMS may be used for collecting information from the network and for changing the programming of network elements.

The air interface between base transceiver stations and mobile stations can be divided into channels in several different ways. Known methods are at least TDM (Time Division Multiplexing), FDM (Frequency Division Multiplexing) and CDM (Code Division Multiplexing). The band available in a TDM system is divided into successive time slots. A certain number of successive time slots forms a periodically repeating time frame. The channel is defined by the time slot used in the time frame. In FDM systems, the channel is defined by the used frequency, while in CDM systems it is defined by the used frequency hopping pattern or hash code. Combinations of the division methods mentioned above can also be used.

Figure 2:
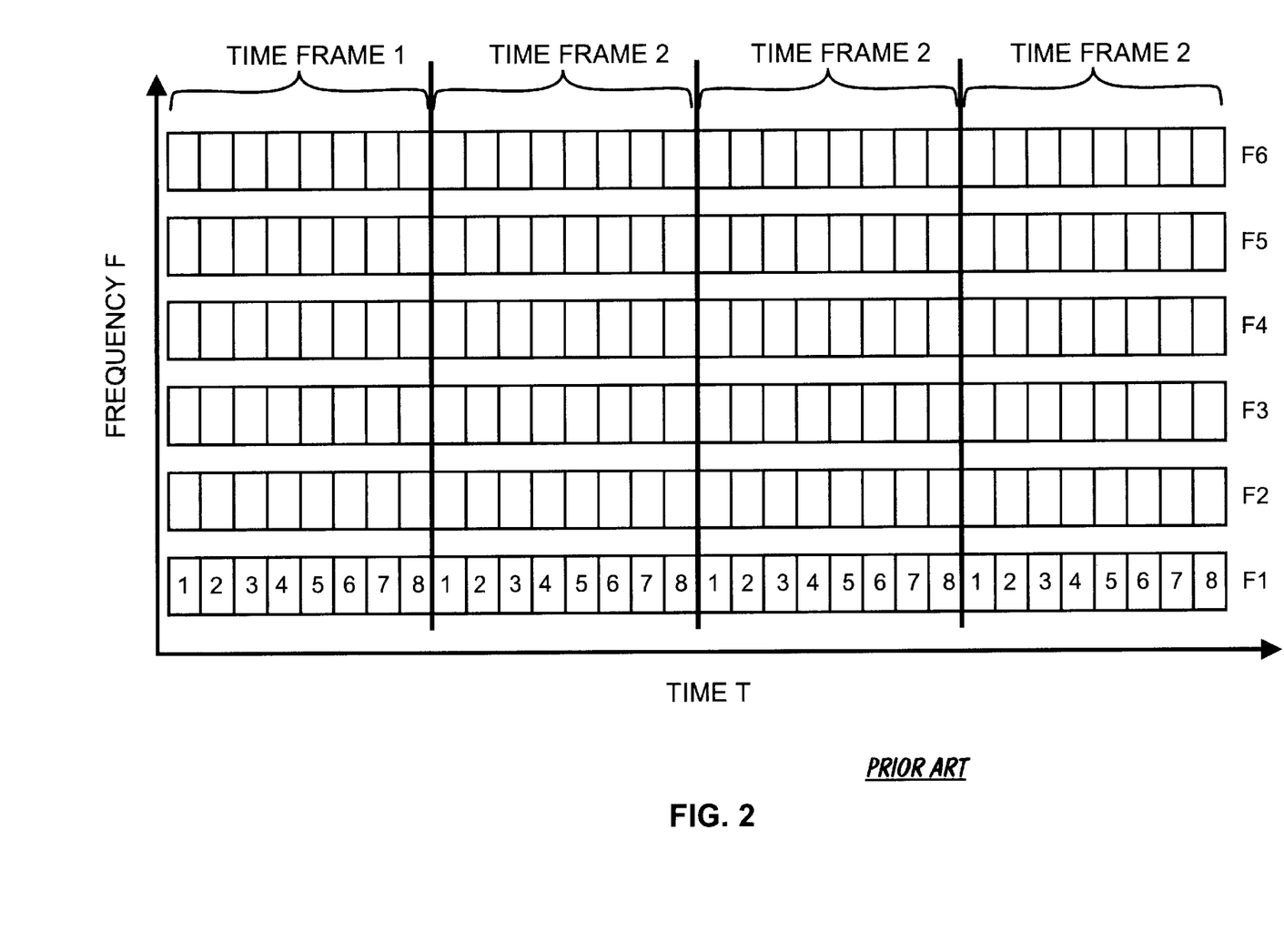
FIG. 2 shows an example of frequency spectrum division into channels.

FIG. 2 shows an example of a known FDM/TDM division. In the figure, frequency is on the vertical axis while time is on the horizontal axis. The available frequency spectrum is divided into six frequencies F1–F6. In addition, the frequency channel formed by each frequency is divided into repeating time frames formed by 16 successive time slots. The channel is always defined by the couple (F, TS) of frequency F and time slot TS used in the time frame.

In order to maximise capacity, channels must be reused in cells which are as close to one another as possible, however, so that the quality of connections using the channels will remain sufficiently good. The connection quality is affected by the sensitivity of transferred information to transfer errors occurring on the radio channel and by the quality of the radio channel. The transfer error tolerance of the signal depends on the characteristics of the transferred information and it can be improved by processing the information with channel coding and interleaving before sending it to the channel and by using retransmission of faulty transfer frames. The Carrier to Interference Ratio (CIR) depicts the radio channel quality which ratio is the ratio between the strengths of the signal sent by the sender and perceived by the recipient on the one hand and of the interference caused to the channel by other connections on the other hand.

Figure 3:
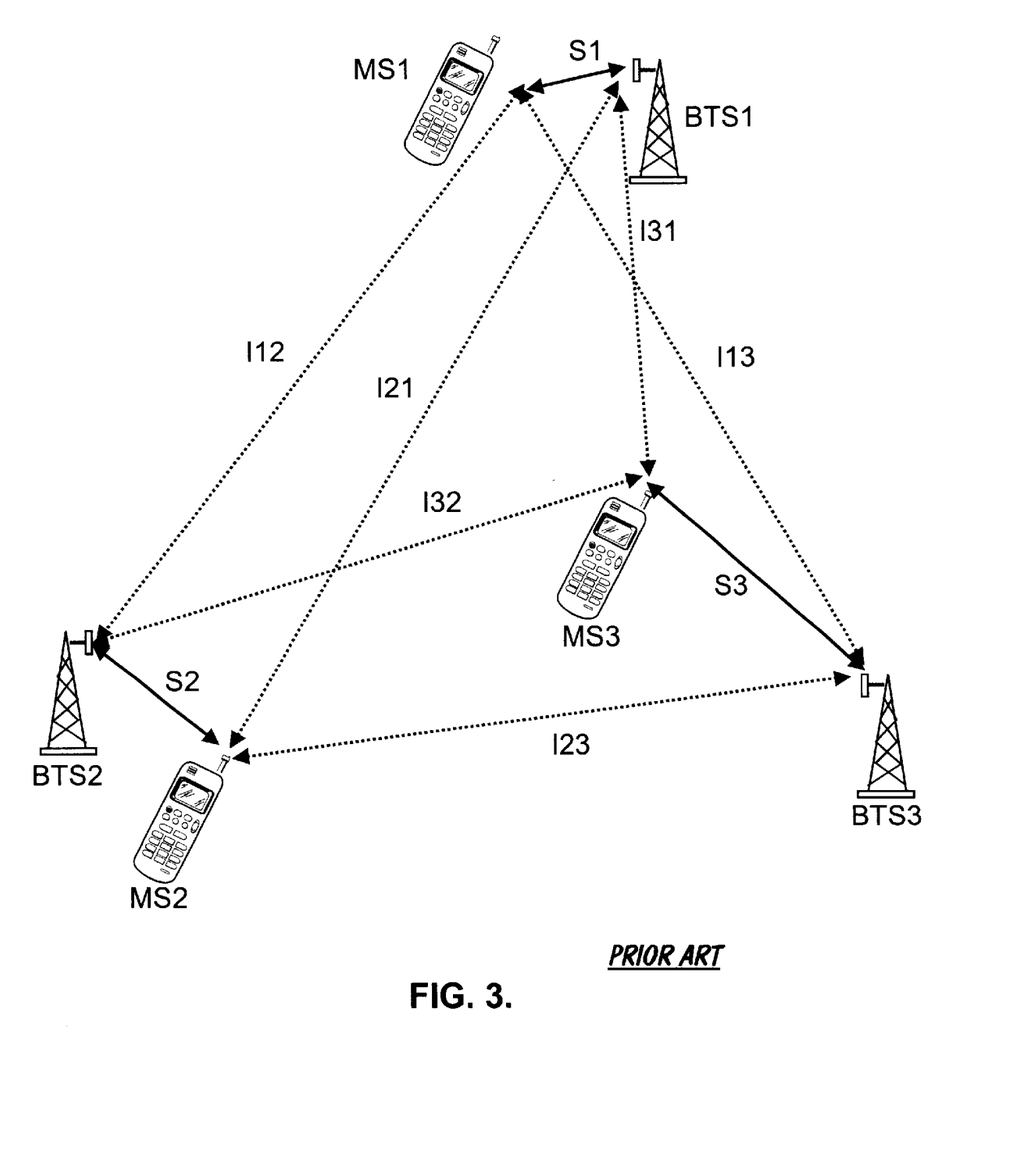
FIG. 3 shows the formation of interference in a mobile communications system.

FIG. 3 shows the emergence of interference caused to each others by simultaneous connections. In the figure three mobile stations MS1, MS2 and MS3 communicate with base transceiver stations BTS1, BTS2 and BTS3. The signal received by base transceiver station BTS1 contains a signal S1, which is sent by mobile station MS1 and which is showed by a solid line and the power of which depends on the transmission power used by mobile station MS1 and on fading on the radio path between mobile station MS1 and base transceiver station BTS1. Typically, the radio path fading is smaller with a shorter distance between base transceiver station and mobile station. In addition to signal S1, the signal received by the base transceiver station contains signal components I21 and I31 caused by signals sent by mobile stations MS2 and MS3. Components I21 and I31 will cause interference in the reception, if they can not be filtered away from the signal received by the base transceiver station. Correspondingly, the signal sent by mobile station MS1 causes signal components I12 and I13 in the signals received by base transceiver stations BTS2 and BTS3 and these signal components may cause interference in the receptions. Components of a similar kind also emerge in the signals received by mobile stations from base transceiver stations.

If signal components I21 and I31 are on the same channel as signal S1, they can not be removed by filtering. Interference may also be caused by signals occurring on other channels than on the same channel. E.g. in systems using FDM frequency division, channels which are adjacent to one another on the frequency level are always slightly overlapping in order to use the frequency spectrum as effectively as possible, which will result in reception interference also from signals which are on the adjacent channel. Correspondingly, when using code division CDM, connections using codes that are too much alike will cause interference to one another. However, so-called neighbour channel interference caused by signals on other channels is considerably smaller than the interference caused by equally powerful signals on the same channel.

The magnitude of interference caused by connections to each other thus depends on the channels used by the connections, on the geographical location of connections and on the transmission power used. These may be influenced through a systematic allocation of channels to different cells taking the interference into account, through transmission power control and through averaging of the interference experienced by the different connections.

It is an objective in channel allocation to allocate such channels to the desired connections which may all be used at the same time while the signal quality remains acceptable. To maximise capacity, channels should be reused as close to one another as possible. The distance at which one and the same channel can be reused so that the CIR remains acceptable, is called the interference distance while the distance at which one and the same channel is reused is called the reuse distance.

Known methods of channel allocation are Fixed Channel Allocation (FCA), Dynamic Channel Allocation (DCA) and Hybrid Channel Allocation (HCA) which is obtained as a combination of FCA and DCA. The idea in fixed channel allocation is to divide the channels used in the system between the cells through a frequency design which is made before the system is put into use. In dynamic channel allocation, all channels are in a common channel pool, from which for the connection to be set up the best channel is chosen for use according to some predetermined norm. In hybrid channel allocation, some of the channels used in the system are divided in a FCA fashion fixedly for use by different cells and the remaining channels are placed in a channel pool, from which they may be taken as required dynamically for use by all cells. The different methods are described very thoroughly in the publication I. Katzela and M. Naghshineh: "Channel Assignment Schemes for Cellular Mobile Telecommunication Systems: A Comprehensive Survey", IEEE Personal Communications, pp. 10–31, June 1996.

Dynamic channel allocation methods can be divided into centralised and decentralised methods. Decentralised methods, wherein the channels are allocated independently in each cell, can be divided further into methods based on the channel allocation situation, on knowledge of radio path fading and on measurement of the occurrence of interference on the channel. In decentralised methods based on knowledge of the allocation situation, information on that allocation situation of channels must be maintained for each base transceiver station which affects the allocation of channels of the base transceiver station's cell. The problem then is the high quantity of signalling. In methods based on measurement of the occurrence of interference on the channel, the best channel for the connection to be set up is determined by measuring the interference level of channels and by, according to the measurements, choosing the channel allowing a sufficiently good carrier to interference ratio. Measurements can never be entirely in real time. For this reason, the method suffers from the lag in measurement data used in the making of allocation decisions, especially in communications containing a lot of short and burst-like transmissions. The centralised methods, wherein the allocation of channels for several cells is done in a centralised fashion, are based on a knowledge of the channel allocation situation and of radio path fading. With this method an almost optimum channel allocation can be achieved, but the high quantity of necessary computing is a problem especially in larger systems.

Using a carrier to interference ratio CIR which is higher than necessary will hardly improve the connection quality in digital systems but will just unnecessarily increase the interference caused to other connections. The difference between the carrier to interference ratio CIR(min) required by the connection and the carrier to interference ratio CIR which can be achieved on the radio channel at the transmitter's maximum transmission power will be called the carrier to interference margin CIRM=CIR−CIR(min) hereinafter. The carrier to interference margin can be used to achieve a carrier to interference ratio which is higher than what the connection requires and/or to lower the transmission power. By lowering the transmission power the interference caused to other connections is reduced at the same time. It is in fact possible considerably to reduce the channel interference distance and this way also the reuse distance by controlling dynamically the transmission power used by connections. A reduction of the reuse distance again will add to the system's capacity. A dynamic control of the transmission power aims at maintaining an adequate connection quality, however, at the same time minimising the transmission power used. Interference may also be reduced e.g. by using directional antennas, whereby the same carrier to interference ratio can be achieved with a lower transmission power.

Figure 4:
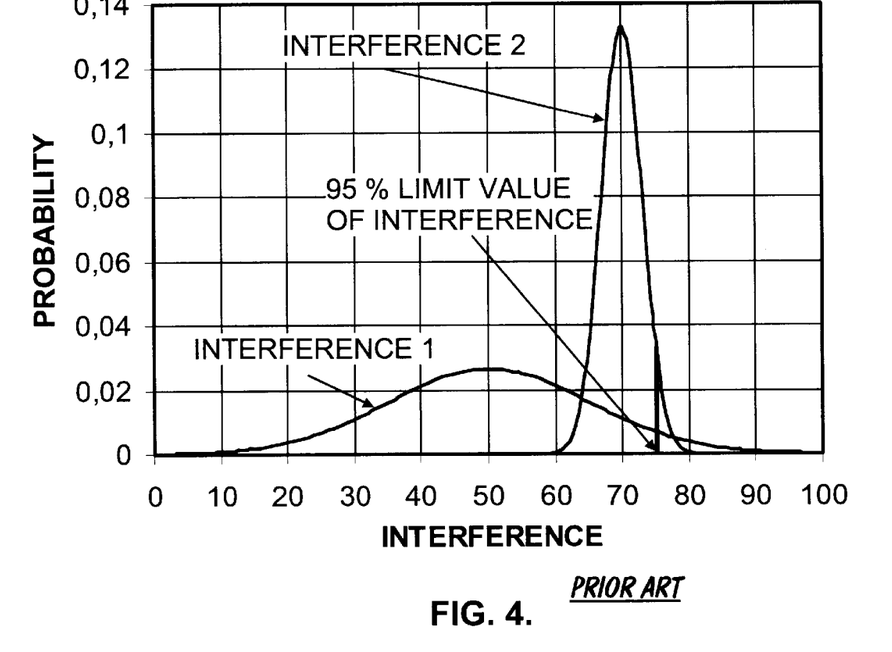
FIG. 4 shows the effect on the permissible average interference level of an equalisation of the interference experienced by different connections.

Different connections experience different interference even after a very successful channel allocation. Some connections may hereby suffer from an interference limiting the connection quality even considerably while other connections would at the same time tolerate an even higher interference level. A channel may be allocated, if the carrier to interference ratio achieved by the connections set up on the channel is below a certain CIR(min) limit for just a small part, e.g. for 5 percent of the connections set up. If variations in the interference level between different connections can be reduced, then the said connection quality requirement can be achieved with an even denser reuse of channels, which will increase system capacity. The situation is explained in FIG. 4, wherein the interference caused to the channel in relative units is on the horizontal axis while the probability of its occurrence for two different interference distributions interference 1 and interference 2 is on the vertical axis. The requirement is that occurrence of interference on the channel is less than 75 units for 95 percent of the connections. Since the distribution of interference 1 is broad, its mean value must be set at the point 50 units for meeting the requirement. Correspondingly, the distribution of interference 2 is considerably narrower, whereby its mean value may be set at the point 70 units. Thus, the average interference may be the higher the less variation of interference there is between the different connections. Correspondingly, the required average interference will determine the reuse distance of channels. By reducing the variation of interference between connections it is thus possible to make denser the reuse of connections and thus to increase network capacity.

Known methods of equalising interference between different connections are frequency hopping in FDM systems and time slot hopping in TDM systems. The name of channel hopping method will be used hereinafter in this application for the methods mentioned above and for other methods based on changing of channel. In CDM systems, interference between connections is equalised through the use of hash codes which are sufficiently different. On the other hand, all connections use the same frequency in the method, which considerably increases the average value of mutual interference.

In frequency hopping, the frequency of the connection is changed frequently. The methods may be divided into quick and slow frequency hopping respectively. In quick frequency hopping, the connection frequency is changed more frequently than the frequency of the used carrier frequency. In slow frequency hopping again the connection frequency is changed more seldom than the frequency of the used carrier frequency.

E.g. in the known GSM system, frequency hopping is carried out so that the individual burst is always sent at one frequency while the burst sent in the next time slot is sent at another frequency. The individual burst may hereby suffer even from a high interference level. However, owing to channel coding and interleaving the connection will be of a sufficiently good quality if a sufficient number of bursts can be transmitted without significant interference. With the aid of frequency hopping this condition is fulfilled for individual connections, even if some bursts would suffer from quite bad interference.

Figure 5:
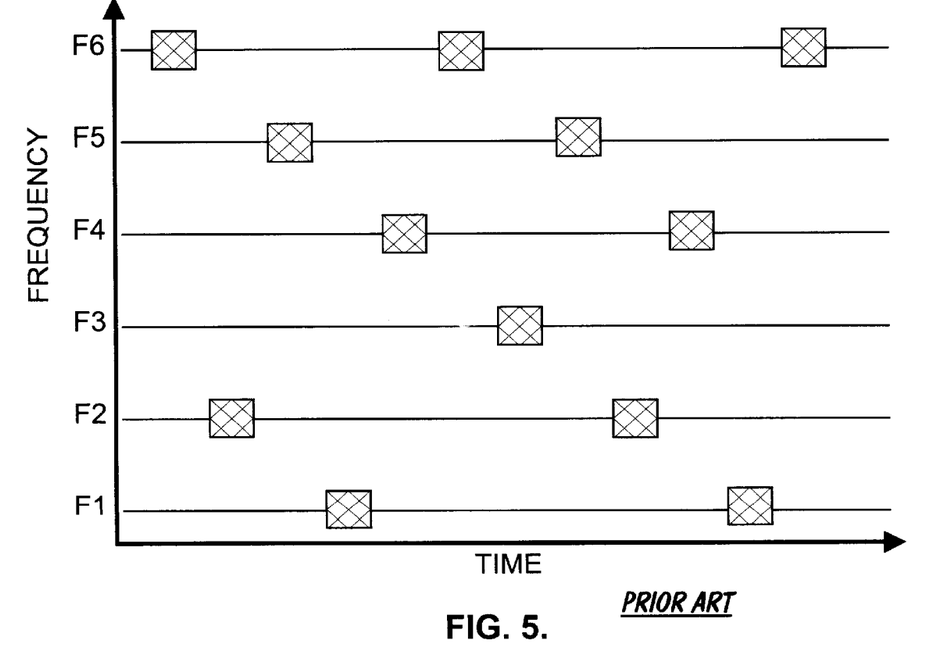
FIG. 5 shows a frequency hopping pattern.

A frequency hopping arrangement is shown in FIG. 5 which illustrates frequencies used with different bursts. Six frequencies, frequencies F1–F6, are allocated for use in the cell. The hopping pattern is cyclic in such a way that listed from the start of the cycle the cell sends its bursts at frequencies F6, F2, F5, F1, F4, F6, F3, F5, F2, F4, F1, whereupon the cycle is repeated. Since the cycle length is 11 bursts, the individual connection in a system e.g. according to FIG. 2 using time frames of 8 time slots will use the same frequency in approximately every fifth burst. Hereby the different fadings experienced at different frequencies by a connection between mobile station and base transceiver station will also be well averaged. The best results in terms of interference equalisation are achieved with frequency hopping when the frequency hopping patterns used in cells located near one another are independent of one another. This is achieved by using carefully chosen periodic or pseudo random frequency hopping patterns.

Time slot hopping is quite similar to frequency hopping in principle. In time slot hopping, the time slot used in the connection is exchanged instead of the frequency. In time slot hopping too the hopping patterns used must be independent of each other in cells located close to one another in order to achieve the best result.

As the number of mobile station subscribers is growing and applications demanding a big band width, such as multimedia applications, are becoming more usual, state-of-the-art methods of channel allocation are no longer able to utilise the available frequency spectrum with sufficient efficiency. Special problems are caused by situations where a limited frequency band is used jointly by several different systems, for example, by a mobile communications system and a wireless office system. It is an objective of the present invention to alleviate these problems by making channel allocation even more effective. This objective is achieved with the method described in the independent claims.

BRIEF DESCRIPTION OF THE INVENTION

The idea of the invention is to allocate channels within a predetermined cell group with a dynamic channel allocation method and to equalise the interference caused in the cell group by connections outside the group of cells e.g. through frequency or time slot hopping.

The cell groups may be superimposed and they may be formed e.g. by the cells of an office system and a broad-coverage mobile communications system, by the cells of mobile communications systems of two different operators, by the cells of a network according to two different systems or by the cells of a network operated by one operator. If the cell groups are formed of cells in one network, a suitable size may be selected for the cell group so that the computing and signalling load required by centralised dynamic channel allocation in the group of cells remains easy to control.

A channel may be allocated for use by a connection, if its interference signal is sufficiently low. The interference signal of the channel includes known interference inside the cell group caused by connections of the same cell group and statistically known interference outside the group of cells caused by connections of other cell groups. Since an interference outside the cell group is higher at the periphery of the cell group than in central parts of the group, the interference inside the cell group which is allowed for the channel must not be so high in cells located at the group's periphery. In addition, in centralised channel allocation the different demands made on channel quality by different connections can be taken into account. In several cases it is possible to achieve a sufficient quality for the connection in several different cells and on several different channels. Inside the group of cells the connection may be directed so that it is set up in such a cell and on such a channel which are best for the group of cells as a whole.

Only statistical information is available on interference outside the group of cells. By dividing the interference caused by connections in other cell groups equally between the connections in the cell group higher interference inside the cell group may be allowed for the connections. The interference inside different cell groups is equalised by using different channel hopping patterns for the individual cell groups.

LIST OF FIGURES

The invention is described more closely referring to the enclosed drawings, wherein.

DETAILED DESCRIPTION OF THE INVENTION

Figure 6:
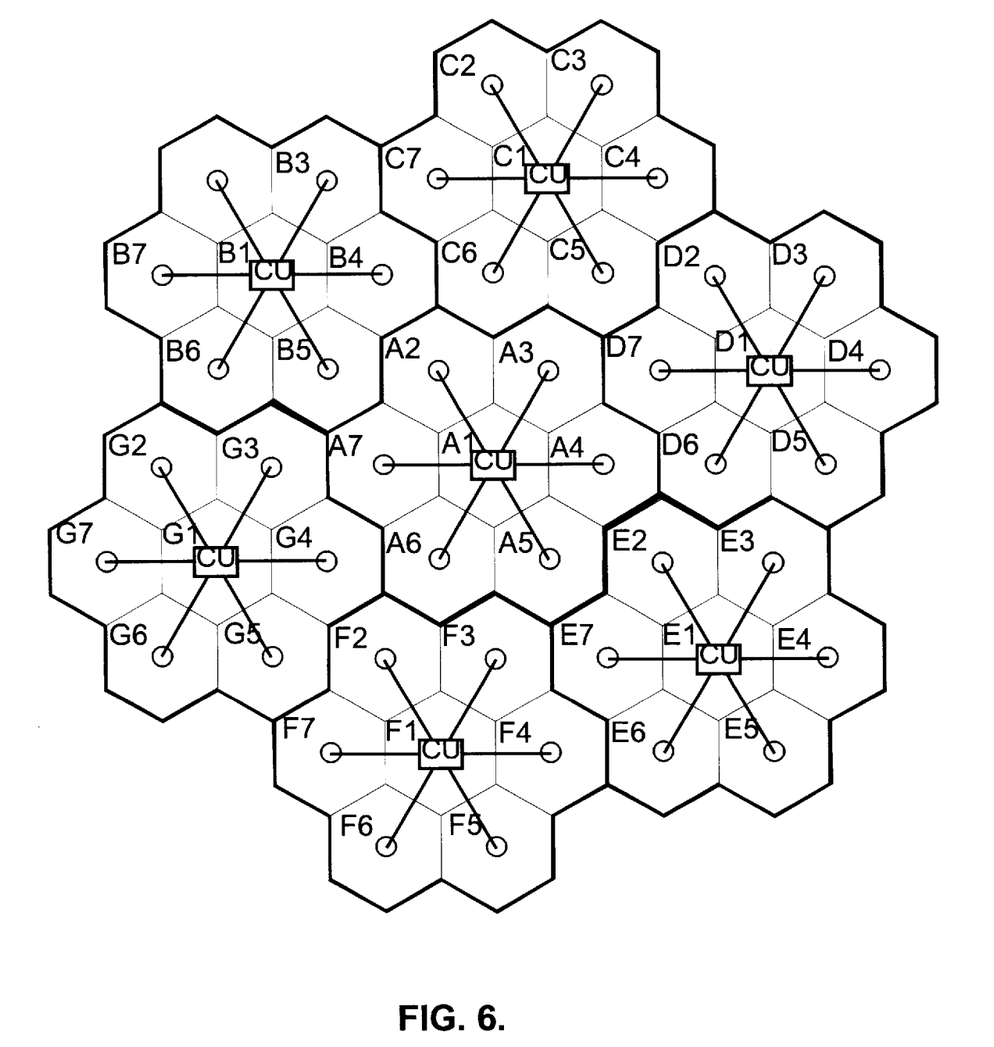
FIG. 6 shows a division of cells into cell groups.

FIG. 6 shows an example of the division of cells into cell groups according to the invention. In the figure the cells are divided into cell groups A–G, each one including seven cells. In each group of cells there is a CU (Central Unit) indicated by a rectangle which attends to centralised dynamic allocation of channels in the group of cells. Cell groups may be superimposed, and they may be formed e.g. by the cells of an office system and a broad-coverage mobile communications system (e.g. GSM), by the cells of a mobile communications system of two different operators, by the cells of a network according to two different systems or by the cells of a mobile communications system of one operator. The central unit CU is a network element having information on fadings on radio channels between base transceiver stations of cells in the cell group and mobile stations making active calls in the cells and on the allocation situation of channels in the group of cells. E.g. in a known GSM system, such an element is a base station controller BSC. Even though the use of dynamic channel allocation in all cell groups is advantageous, the invention may also be used in arrangements, wherein channels are allocated dynamically in some cell groups only. Nor must all cells necessarily belong to some group of cells. E.g. when increasing the capacity of a cellular radio network by supplementing an operating macrocell network with a microcell network, superimposed microcells and macrocells can be arranged so that only the smaller microcells are divided into cell groups, inside which channels are allocated dynamically according to the known allocation situation. By using a channel hopping method which is common for the group of cells, the interference caused to one another by microcells and macrocells can be averaged so that the quality of all connections will remain sufficiently good without having necessarily to change the ready-made frequency design of macrocells.

Figure 7:
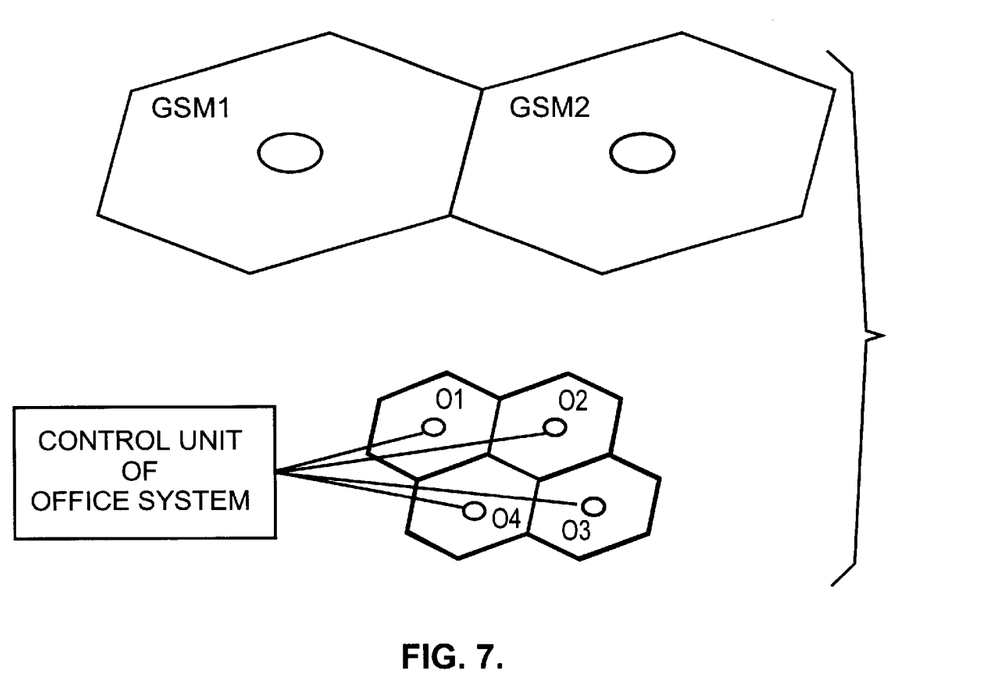
FIG. 7 shows an arrangement, wherein two superimposed systems use the same frequency band.

FIG. 7 shows a situation where two superimposed systems, an office system and a mobile communications system, use the same frequency band. Cells GSM1 and GSM2 are such cells in a mobile communications system the channels of which are allocated fixedly with the aid of a network design made in advance. Cells O1, O2, O3 and O4 belong to an office system operating on the same frequency band as the mobile communications system, and allocation of their channels is performed in the central unit of the office system. The systems do not know each other's allocation situation, so they can have only statistical information about interference caused from the other system.

Figure 8:
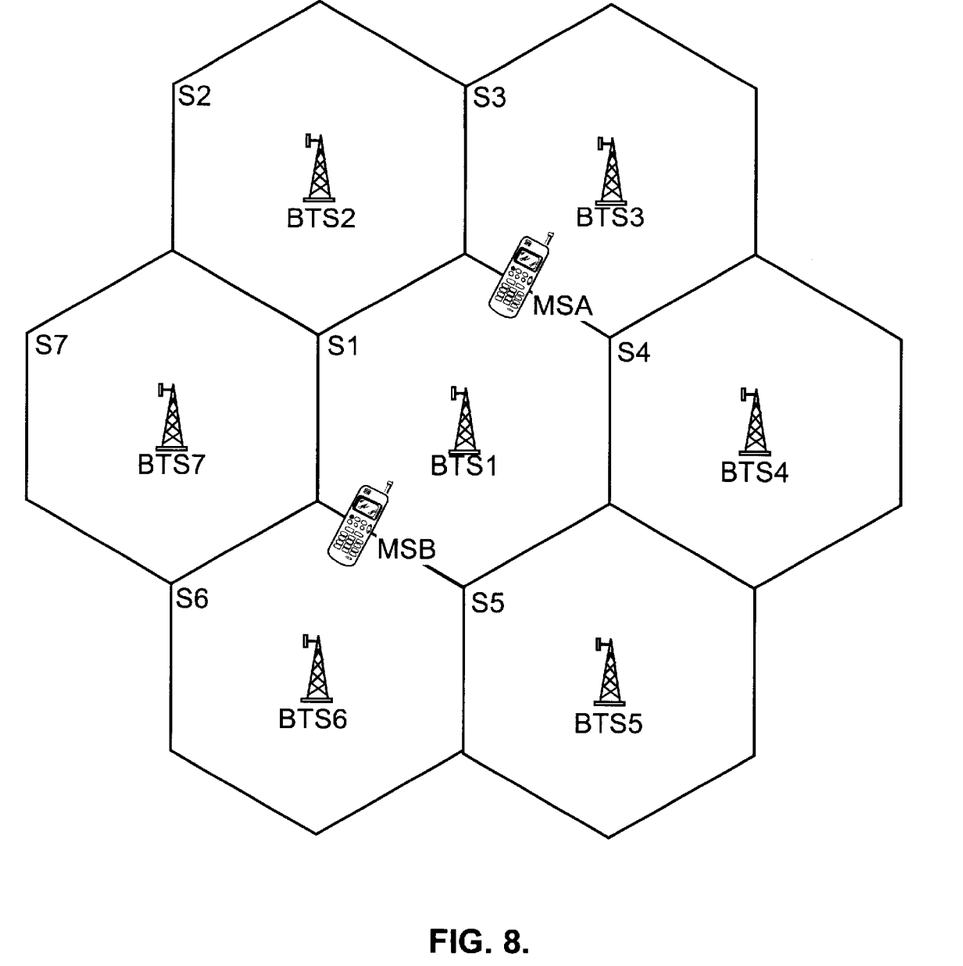
FIG. 8 shows an example of centralised cell selection and channel allocation inside a group of cells.

It is an advantage of centralised dynamic channel allocation that a connection to be set up can always be set up in that cell and on that channel which are best for the whole. A situation as the one shown in FIG. 8 is examined wherein cells S1–S7 belong to the same group of cells. Mobile station MSA is in connection with the base transceiver station of cell S3. The carrier to interference margin in the downlink direction from base transceiver station to mobile station is small due to the high fading of the radio channel. Mobile station MSB makes a request for connection setup to cell S1. Based on information in the network element (not in the figure) attending to centralised allocation of channels in the cell group, mobile station MSB achieves the best possible connection quality in cell S1, and a somewhat poorer but still adequate quality with the base transceiver station in cell S6. Thus, the best solution solely for MSB would be to set up the connection with the base transceiver station in cell S1. However, the transmission of cell S1 would then cause additional interference to that downlink signal passing from base transceiver station BTS3 to mobile station MSA which already has a small carrier to interference margin. Correspondingly, the connection between mobile station MSB and base transceiver station BTS6 will not signficantly interfere with the downlink signal received by MSA. This information is also available to the network element attending to centralised channel allocation, so mobile station MSB may be directed into connection with the base transceiver station of cell S6. Hereby MSA and MSB will both achieve a sufficiently good connection with their base transceiver stations.

The interference caused to connections includes interference I(own) inside the cell group caused by other connections in the same cell group and interference I(others) outside the cell group caused by other cell groups. Of these, the interference I(own) caused by connections in the same cell group can be controlled by the central unit. Even though the central unit has no information about the allocation situation of channels in other cell groups, it does have statistical information about the interference I(others) coming from outside the cell group. The interference outside the cell group is of course higher in peripheral areas of the cell group than in central areas of the group. On the other hand, connections in cells located in a peripheral area of the cell group will cause more interference to other cell groups than the connections of cells in central areas.

It is a requirement in channel allocation that the carrier to interference margin CIRM of the allocated channel will exceed the minimum requirement CIRM(min) made on it by no less than a predetermined probability of e.g. 95 percent. The signal strength C may be determined with the aid of measurements, so in order to meet this minimum requirement such occurrence of interference must be demanded of the channel which is below a certain limit I(max). Thus, the total interference I=I(own)+I(others) including inside interference I(own) and statistically known interference I(others) outside the cell group must be below the limit I(max) with 95 percent probability. The channel may be allocated based on known interference inside the cell group, if I(own)<I(max)−I(others, 95%), wherein I(others, 95%) is an interference value of which the interference caused by connections of other cell groups will fall short in 95 percent of cases.

Figure 9:
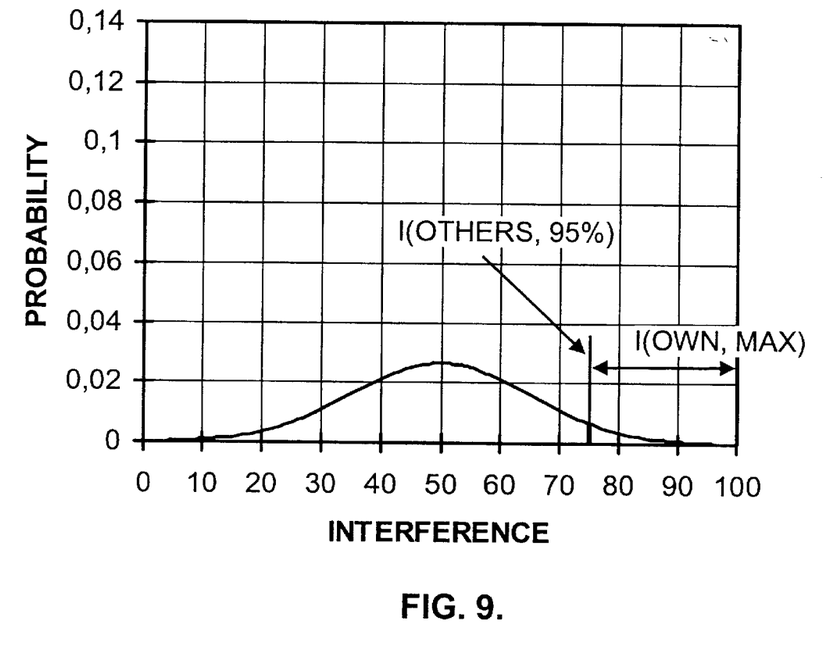
FIG. 9 shows an example of the distribution of interference caused by connections in other cell groups.

Such a situation will be examined as an example, wherein 100 units are allowed as the maximum value of interference occurrence on the channel, and the distribution of interference caused by other cell groups is as shown in FIG. 9. The figure shows the probability of interference occurrence as a function of the interference strength presented as relative units. The interference caused by other cell groups is 50 units on an average, but since the distribution is relatively broad, interference will be over 75 units in five percent of cases. Under these circumstances, the channel may be allocated, if the interference caused to the channel by other connections of the cell group is less than I(own, max)=25 units.

Figure 10:
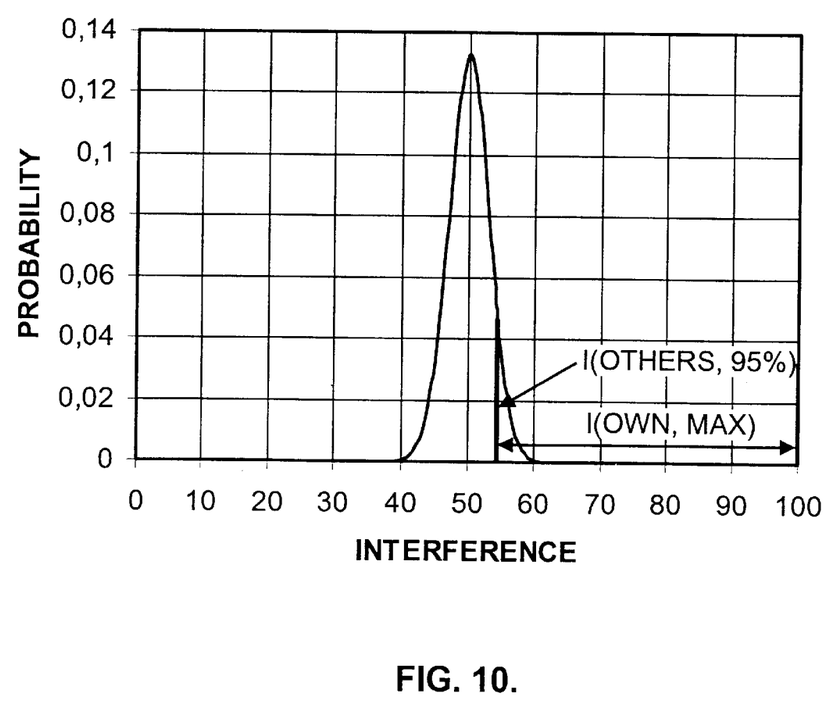
FIG. 10 shows an example of equalised distribution of interference caused by connections in other cell groups.

According to the invention, the interference caused to different channels by other cell groups is equalised with the aid of frequency or time slot hopping. Inside the cell group all connections hop in the same hopping sequence. In order to equalise the interference between groups such hopping sequences are used in different cell groups which are as independent of each other as possible. The distribution shown in FIG. 9 becomes sharper owing to the equalisation. An equalised distribution is shown in FIG. 10. The equalisation will not affect the average interference value which remains a standard 50 units, but in 95 percent of cases the interference is nevertheless below 55 units. The channel may hereby be allocated, if the interference caused to the channel by other connections of the cell group is less than I(own, max)=46 units. By equalising interference between cell groups it is thus possible to allow higher interference intra the cell group. This, on the other hand, makes it possible to reuse channels closer to one another, whereby network capacity will increase.

The effect of interference equalisation according to the invention is examined with the aid of the following simplified example. Cell groups A, B and C are examined in FIG. 6. Two frequencies, frequencies F1 and F2, are allocated for use by the system. If two connections use the same frequency in adjacent cell groups, the bit error ratio BER of mutually interfering connections will grow to a value of $1,25*10^{-5}$. If the channel used by the connection is not used in adjacent cell groups, the error ratio will be much lower, $2*10^{-6}$. Thanks to the channel coding, interleaving and retransmissions used the quality of the connection is sufficiently good, if the bit error ratio remains below a value of $10^{-5}$.

Frequencies could be allocated fixedly for use by the groups, e.g. in such a way that frequency F1 would be used in group A and frequency F2 would be used in groups B and C. If simultaneous connections would then exist in groups B and C, their BER would be $1,25*10^{-6}$. With this method the system could thus not be made to operate in practice given the two frequencies F1 and F2 used.

Although the quality of connections in cell groups B and C is too poor in the situation presented above, the bit error ratio of the connection in cell group A is correspondingly clearly below the limit value of $10^{-5}$. If the bit error ratios of connections are successfully divided equally between the connections, then all would have BER=$9*10^{-6}$, which would guarantee a sufficient quality of the connection for all connections.

Interference between connections can be equalised with the aid of frequency hopping. In frequency hopping different frequencies are used in different cell groups in different bursts. E.g. the following sequence repeating in cycles of three bursts may be used as the frequency hopping sequence:

| A | F1 | F1 | F1 |
|---|----|----|----|
| B | F1 | F2 | F2 |
| C | F2 | F2 | F1 |

In the first bursts of the sequence A and B hereby use the same frequency F1, whereby in the bursts of connections in groups A and B the bit error ratio BER=$1,25*10^{-5}$ and in the burst of the connection in group C BER=$2*10^{-6}$. In the second burst groups B and C use the same frequency F2, whereby in the bursts of their connections BER=$1,25*10^{-5}$ and in the burst of the connection in group B BER=$2*10^{-6}$. $9*10^{-6}$ is obtained as the average bit error ratio BER of three bursts in the sequence for all connections, which guarantees a good quality for all connections.

It should be noticed that it is not necessary for implementation of the invention that a frequency hopping sequence is used in all cells causing interference to the cell group. For example, in the situation shown in FIG. 7, wherein channels are allocated fixedly for cells GSM1 and GSM2, a channel hopping pattern which is uniform for the cells and which is used in the cell group formed by cells O1, O2, O3 and O4, is sufficient for equalisation of the interference.

Advantages of frequency hopping are e.g. a minor need of designing in advance. It is a sufficient design that hopping patterns which are as different as possible are made available to the different cell groups. In their simplest form, hopping patterns can be allocated as pseudo random series. The interference experienced by connections can also be equalised with known time slot hopping besides or instead of frequency hopping.

The quality of a connection is affected not only by the bit error ratio achieved on the radio channel but also by the susceptibility of the transferred information to transfer errors. The different demands made by different connections on the radio channel quality can be taken into account in centralised dynamic channel allocation which is performed inside the group of cells. In centralised channel allocation, the demand CIR(min) to be made on the carrier to interference ratio CIR of the channel of the connection may be different e.g. for different types of telecommunication, such as transmission of speech, video or data signals. It is also advantageous for the whole to locate those connections, which with the aid of a more efficient channel coding, longer interleaving and retransmissions achieve a sufficiently good connection quality even on a poorer radio channel, in a cell where they will interfere with others as little as possible.

Since e.g. video data makes rather strict requirements both on transfer delay and on transfer faultlessness, the highest CIR demand may be made on video data. Speech data makes strict demands on delay, but will tolerate relatively many transfer errors. Thus it will make do with a lower carrier to interference ratio than what is required by video data. In data transmission there is no significant limitation of delay, but on the other hand, data transmission does not tolerate any transfer errors at all. Faultless transfer is achieved by using a high CIR value and also by processing the data to be transferred before sending it to the radio channel into a form having a better tolerance of transfer errors. The transfer error tolerance can be improved e.g. by using powerful channel coding, a long interleaving cycle and retransmissions of faulty frames, although these will cause additional delay in the data transfer. Since data transfer does not limit delay significantly, it can be given the lowest CIR requirement of all with the aid of channel coding, and the connection can be directed to a cell where it will cause as little interference to others as possible, which is advantageous for the whole.

What is claimed is:

1. Method for channel allocation in a radio system including mobile stations and base transceiver stations and cells defined by radio coverage areas of the base transceiver stations, and from which a group of cells is formed by at least two cells, and wherein at least one channel hopping method is used for averaging of interference between connections comprising:

utilizing a first channel hopping pattern which is common to the group of cells, allocating channels within the cell group with a dynamic channel allocation method, which is based on a knowledge of interferences caused by connections of the cell group to one another according to the allocation situation of the cell group, utilizing other channel hopping patterns, which differ essentially from the first channel hopping pattern, for cells outside the cell group which cause interference to the cell group.

2. Method as defined in claim 1, wherein the channel hopping pattern is a frequency hopping pattern.

3. Method as defined in claim 2, wherein the frequency hopping pattern is a pseudo random frequency hopping pattern.

4. Method as defined in claim 2, wherein the frequency hopping pattern is a cyclic frequency hopping pattern.

5. Method as defined in claim 1, wherein the channel hopping pattern is a time slot hopping pattern.

6. Method as defined in claim 5, wherein the time slot hopping pattern is a pseudo random time slot hopping pattern.

7. Method as defined in claim 5, wherein the time slot hopping pattern is a cyclic time slot hopping pattern.

8. Method as defined in claim 1, wherein in cells located centrally in the cell group a higher interference caused by connections in the same cell group is allowed than in cells located at a periphery of the cell group.

9. Method as defined in claim 1, wherein in that at least two cell groups are formed, of which one cell group is formed by the cells of an office system while the other cell group is formed by the cells of a cellular radio system.

10. Method as defined in claim 1, wherein at least two cell groups are formed which include cells of the same network.

11. Method as defined in claim 1, wherein at least two cell groups are formed, of which one cell group is formed by the cells of one operator's cellular radio network while the other cell group is formed by the cells of another operator's cellular radio network.

12. Method as defined in claim 1, wherein at least two cell groups are formed, of which one cell group is formed by cells of a first cellular radio system while the other cell group is formed by the cells of another cellular radio system.

13. Method as defined in claim 1, wherein at least two cell groups are formed, of which one cell group is formed by cells of a first office system while the other cell group is formed by the cells of another office system.

14. Method as defined in claim 1, wherein the coverage area of the cells in the cell group is at least partly superimposed on the coverage area of cells in another cell group.

15. Method as defined in claim 1 wherein the coverage area of the cells in the cell group is at least partly superimposed on the coverage area of at least one cell not belonging to the cell group.

* * * * *